Patented Oct. 12, 1926.

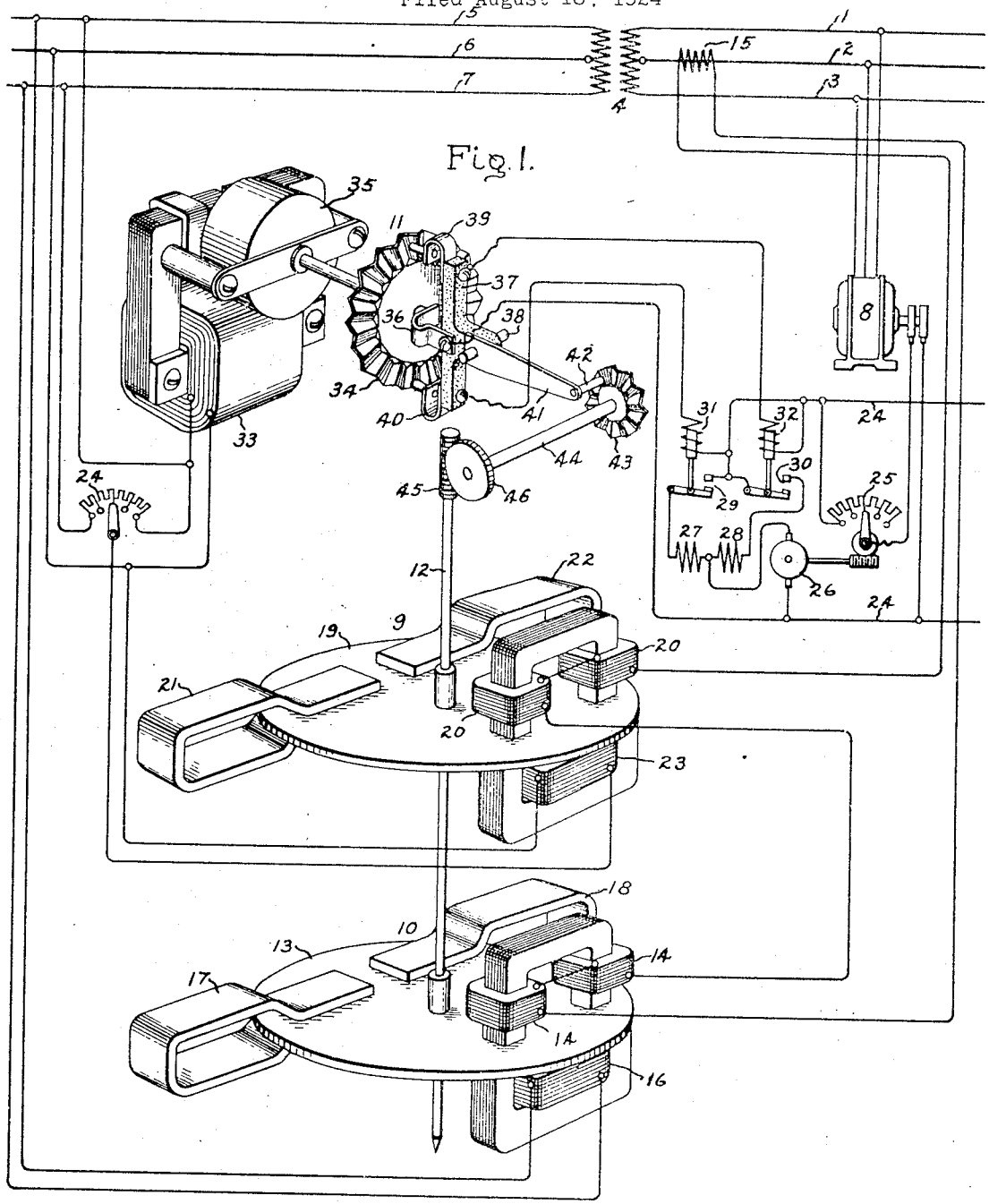
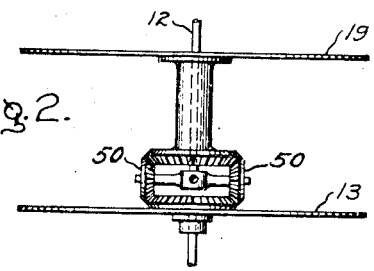

1,603,067

UNITED STATES PATENT OFFICE.

FRANK T. COLDWELL, OF ALPLAUS, AND LOUIS W. THOMPSON, OF SCHENECTADY, NEW YORK, ASSIGNORS TO GENERAL ELECTRIC COMPANY, A CORPORATION OF NEW YORK.

POWER-FACTOR-REGULATING SYSTEM.

Application filed August 18, 1924. Serial No. 732,794.

Our invention relates to systems for regulating the power factor of electric power transmission and distribution circuits, and has for its object the provision of an improved regulating apparatus and regulating system through which the power factor, or other electrical conditions, of such circuits may be readily predetermined and accurately maintained.

It is well known that the size of the equipment required to generate and transmit a given amount of power is dependent upon the power factor at which this power is utilized. It is therefore desirable to provide means for maintaining the power factor at a high value. In the past, various power factor regulating systems have been proposed and used for this purpose, many of them comprising means operable in accordance with the relation existing between the power circuit voltage and current to control the excitation of a synchronous machine through which a part or all of the reactive component of the load is supplied. Our invention appertains to this class of systems and involves the use of improved means for predetermining an electrical condition such as the voltage or current of a power circuit or the relation to be maintained between the power and reactive components of the load supplied through such a circuit and for maintaining this condition or relation regardless of changes in the characteristics of the load.

Our invention will be better understood from the following description when considered in connection with the accompanying drawing and its scope will be pointed out in appended claims.

Referring to the drawing, Fig. 1 shows a regulating apparatus in which our invention has been embodied; and Fig. 2 shows a modification of the meter element of Fig. 1.

Fig. 1 shows a polyphase power circuit comprising conductors 1, 2 and 3, and, for the purpose of explaining the invention, it will be assumed that power is supplied to this circuit through a transformer 4 and another power circuit comprising conductors 5, 6 and 7. It will of course be understood that, instead of merely interconnecting two circuits, the transformer 4 may be the point of contact or one of the points of contact between two different transmission or distribution systems, or that our invention may be utilized to control the power factor of a single circuit. The term power circuit as used herein is therefore intended to include not only a single circuit, but also a transmission or distribution network including any number of circuits.

The reactive and power components of the load supplied from the circuit comprising conductors 1, 2 and 3 may vary from time to time and, if it is desired to maintain the power factor of the load supplied to this circuit through the circuit comprising conductors 5, 6 and 7 at or above a given predetermined value, means must be provided for supplying all or a part of the reactive load component. In the drawing this means is illustrated as a synchronous machine 8, the excitation of which may be varied to control the amount of leading current or reactive load component which it supplies to the circuit comprising conductors 1, 2 and 3.

For the purpose of controlling the excitation of the synchronous machine 8 in accordance with the relation existing between the power and reactive components of the load supplied from the circuit conductors 1, 2 and 3, means comprising meter elements 9 and 10 and an anti-hunting device 11 are provided. The meter elements 9 and 10 are arranged to exert on the shaft 12 opposed torques which are dependent on the values of the power and reactive load components respectively. The meter element 10 comprises a disk armature 13 coupled to the shaft 12, a current coil 14 arranged to be supplied with current from a current transformer 15 connected in series with the line conductor 2, and a voltage coil 16 connected between the line conductors 5 and 7, and damping magnets 17 and 18 which are provided for predetermining the rate at which the disk 13 responds to the torque produced through the coils 14 and 16. This element exerts on the shaft 12 a torque which is dependent on the reactive component of the load.

The meter element 9 comprises a disk armature 19, a current coil 20 connected in series with the current coil 14 to the transformer 15, damping magnets 21 and 22 and a voltage coil 23 which is connected between the line conductor 6 and a resistor connected between the line conductors 5 and 7. This meter element is arranged to exert on the shaft 12 a torque which is opposed to that exerted thereon by the meter element 10 and which is dependent on the value of the power component of the load. The resistor 24 is provided for the purpose of changing the phase of the voltage applied to the coil 23, and may be adjusted to maintain the power factor of the load supplied through circuit conductors 5, 6 and 7 at any desired value.

The exciting current of the synchronous machine 8 is supplied through the direct current line 24 and an adjustable field resistor 25, the adjustment of which is controlled by a pilot motor 26. The motor 26 is provided with oppositely wound field windings 27 and 28 which are arranged to be connected to the direct current line 24 through contactors 29 and 30. The operating coils 31 and 32 of the contactors 29 and 30 respectively are arranged to be energized through the direct current circuit 24 in response to operation of the meter elements 9 and 10 and the anti-hunting device 11.

The anti-hunting device 11 comprises a motor which has its field winding 33 connected to the line conductors 5 and 6 and is arranged to rotate a contact disk 34 through a gear contained in the gear case 35. The disk 34 is corrugated or provided with radial ribs which form contact surfaces around its outer portion and is arranged to make rubbing contact with a contact member 36 connected to one side of the line 24. The contact member 36 is mounted on an insulation member 37 which is pivoted at 38 and supports resilient contact members 39 and 40. The contact members 39 and 40 are connected to the contactor operating coils 32 and 31 respectively and are provided for periodically completing the connection of these coils to the line 24 under different conditions of operation. Also pivoted at 38 and arranged to move with the insulation member 37 is a member 41 bearing in its free end a pin 42 which is adapted to cooperate with a rotatable member 43 in response to rotation of the shaft 44 which is driven by the meter elements 9 and 10 through shaft 12 and gears 45 and 46.

The teeth or corrugations of the gear member 43 are set at an angle of less than 90 degrees with the axis of the shaft 44 to permit continued rotation of the shaft 44 when the member 41 has been moved either to an upper or lower position. In the upper position of the member 41, the contact 39 is rocked into a position where rotation of the disk 34 brings the contact surfaces of its ribs or corrugations into engagement with this contact, thereby periodically completing the connection of the contactor operating coil 32 to the line 24 and at the same time striking the contact 39 a slight blow which tends to move the pin 42 toward the shaft 44 in a manner tending to delay the subsequent closure of the coil circuit and to exert a restraining force on the meter device. This action aids somewhat in preventing hunting. In the lower position of the member 41, the contact 40 is rocked into a position to engage the contact surfaces of the corrugations on the disk 34 and periodically complete the connection of the contactor operating coil 31 to the circuit 24. In either position the pin 42 is moved far enough away from the shaft 44 to permit free movement of this shaft, and this position is maintained, or repeatedly assumed due to rotation of the shaft 44, until the torque of this shaft is balanced and it ceases to rotate.

In explaining the operation of our invention, it will be assumed that a balanced polyphase load is fed through the power circuits and that the power factor of the load supplied from line conductors 1, 2 and 3 has decreased below the value predetermined by the adjustment of the resistor 24 which determines the phase of the voltage applied to the coil 23 and consequently the power factor at which the torques exerted by the meter elements 9 and 10 will be balanced. Under these conditions the disk 43 is rotated in a clockwise direction, for example, the contact 39 is in a position to engage the contact surface of the ribs on the disk 34, and the contactor 30 is periodically closed to operate the motor 26 and resistor 25 in a manner to increase the field excitation of the machine 8, the duration and frequency of the periods during which the coil 32 is energized and the contactor 30 is closed being determined by the width of the contact surfaces and the rate at which the disk 34 is driven by the motor. The field excitation of the machine 8 will thus be subjected to a series of slight increases, and overtravel of the motor 26 and hunting of the regulating system will be prevented. As the excitation of the machine 8 is increased, less and less of the reactive load component will be supplied through the conductors 5, 6 and 7 and the value of the torque exerted on the shaft 12 by the meter element 9 will gradually approach the value of that exerted on this shaft by the meter element 10. When these two torques have become equal, the pin 42 is moved into its neutral position, the shaft 12 ceases to rotate, and the contacts 39 and 40 are both maintained in a position where they do not engage the contact surfaces of the disk 34.

Should the power factor of the load supplied from the line conductors 1, 2 and 3 increase for any reason, the torque exerted by the meter elements 9 and 10 is again unbalanced and the member 43 is rotated in a counter-clockwise direction, thereby moving the contact 40 into a position to engage the contact surfaces of the disk 34, periodically closing the contactor 29 by energization of the operating coil 31 and decreasing the excitation of the machine 8 in a manner to prevent hunting of the regulating system. This action will continue until the power factor of the load supplied through the line conductors 5, 6 and 7 has decreased to a value predetermined by the adjustment of the resistor 24, and when this value has been reached, the pin 42 will be moved into a neutral position as previously explained. The further operation of our invention will be readily understood.

Fig. 2 shows a modification in the arrangement of the meter disks 13 and 19 of Fig. 1 which permits continuous rotation of these disks and renders the regulating apparatus more sensitive to changes in the relation between the power and reactive components of the load. In this modification, the disks 13 and 19 are interconnected by a differential gear the idler members 50 of which are arranged to drive the shaft 12 at a speed dependent on the relation existing between the speeds of the two disks. The operation of this modification will be readily understood without detailed explanation.

We have explained our invention by illustrating and describing a specific embodiment thereof, but it will be readily understood by those skilled in the art that it may be embodied in other forms than that shown and described. We accordingly do not wish to be restricted to the particular arrangement disclosed herein by way of example for the purpose of setting forth our invention in accordance with the patent statutes. The terms of the appended claims are, therefore, not restricted to the precise arrangement disclosed, but are intended to cover all changes and modifications within the true spirit and scope of our invention.

What we claim as new and desire to secure by Letters Patent of the United States, is:—

1. A pair of interconnected power circuits, and a regulating system wherein means are provided for predetermining a relation to be maintained between the power and reactive components of the load supplied through one to the other of said circuits and wherein control means operable in accordance with said relation are arranged to vary the operation of means connected to one of said circuits for supplying reactive current thereto, characterized by the fact that said control means comprises a movable member having a plurality of contact surfaces for periodically rendering said control means ineffective to change the operation of said current supply means whereby hunting of said system is prevented.

2. A pair of interconnected power circuits, and a regulating system wherein means are provided for predetermining a relation to be maintained between the power and reactive components of the load supplied through one to the other of said circuits and wherein means are provided for supplying reactive current to one of said circuits comprising control means including a rotatable disk having a plurality of contact surfaces, and a contact member operable by said control means to a position where it cooperates with said contact surfaces to periodically change the operation of said current supply means.

3. A pair of interconnected power circuits, and a regulating system wherein means are provided for predetermining a relation to be maintained between the power and reactive components of the load supplied through one to the other of said circuits and wherein means are provided for supplying reactive current to one of said circuits, comprising control means including a contact member mounted on a support arranged to be rocked into one position by said control means when the reactive load component of said first mentioned circuit is too high to maintain said relation and into another position when the reactive load component of said first mentioned circuit is too low to maintain said relation, and a rotatable disk having contact surfaces arranged to cooperate with said contacts for periodically changing the operation of said current supply means to maintain said relation.

4. A pair of interconnected power circuits, and a regulating system wherein means are provided for predetermining a relation to be maintained between the power and reactive components of the load supplied through one to the other of said circuits and wherein means are provided for supplying reactive current to said second mentioned circuit, comprising control means including a movable member having a plurality of contact surfaces, means for producing opposed torques the resultant of which is dependent on the relation existing between the power and reactive load components of said first mentioned circuit, and a contact member coupled to said torque producing means and operable to a position where it cooperates with said contact surfaces periodically to change the operation of said current supply means.

5. A power circuit, and a regulating system comprising means for supplying reactive current to said circuit, and control means including a pair of meter elements connected to said circuits for producing opposed torques the resultant of which is dependent on the relation existing between the power and reactive load components of said circuit, a pair of contact members mounted on a support coupled to said meter elements and arranged to be rocked into positions determined by the direction in which said resultant torque is exerted, and a movable member having a contact surface arranged to cooperate with one of said contact members to periodically increase the reactive load of said current supply means when said resultant is in one direction and to periodically decrease the reactive load of said current supply means when said resultant is in the opposite direction.

6. A power circuit, and a regulating system comprising means for supplying reactive current to said circuit, control means including means connected to said circuits for changing the operation of said current supply means in response to a resultant torque the value and direction of which is dependent on the relation existing between the power and reactive load components of said circuit, and circuit interrupting means including a contact member and a movable member having a plurality of contact surfaces arranged to cooperate with said contact member for periodically rendering said control means inoperative to change the operation of said current supply means.

7. A power circuit, and a regulating system comprising current supply means, a device for producing a torque dependent upon an electrical condition of said circuit, a pair of contact members mounted on a support coupled to said device and arranged to be rocked into positions determined by the direction in which the torque of said device is exerted, and a movable member having a contact surface arranged to cooperate with one of said contact members to periodically increase the current supplied to said circuit by said supply means when the torque of said device is exerted in one direction and to cooperate with the other of said members to periodically decrease the current supplied to said circuit from said supply means when the torque of said device is exerted in the opposite direction.

8. A power circuit, and a regulating system comprising current supply means, a device for producing a torque dependent upon an electrical condition in said circuit, a pair of contact members mounted on a support coupled to said device and arranged to be rocked into positions determined by the direction in which the torque of said device is exerted, and a rotatable disk having radial contact surfaces arranged to cooperate with one of said contact members to periodically increase the current supplied to said circuit by said supply means when the torque of said device is exerted in one direction and to cooperate with the other of said members to periodically decrease the current supplied to said circuit from said supply means when the torque of said device is exerted in the opposite direction.

9. A regulating apparatus for an electric circuit comprising an electroresponsive torque device adapted to be connected to produce a torque dependent on an electrical condition of the circuit to be regulated, regulating means, and means for controlling said regulating means in response to the operation of said torque device comprising a pair of contact members arranged to be rocked into positions determined by the direction in which the torque of said torque producing device is exerted, and a movable member having a contact surface arranged to cooperate with said contact members periodically to actuate said regulating means in a direction dependent on the direction in which the torque of said torque producing device is exerted.

10. A regulating device comprising a torque producing device, a pair of contact members arranged to be rocked into positions determined by the direction in which the torque of said torque producing device is exerted, and a rotatable disk having a plurality of radial contact surfaces arranged to cooperate with one of said contact members when the torque of said device is exerted in one direction and with the other of said contact members when said torque is exerted in the opposite direction.

11. A regulating device comprising means for exerting a force in a plurality of directions, a pair of contact members arranged to be moved into positions determined by the direction in which the force of said means is exerted, and a movable member having a contact surface arranged to cooperate periodically with one of said contact members when the force of said means is exerted in one direction and with the other of said contact members when the force of said means is exerted in another direction.

12. A regulating device comprising means for exerting a force in a plurality of directions, a contact member arranged to be moved into positions determined by the direction in which the force of said means is exerted, and a rotatable member having a plurality of conductive contact surfaces arranged to be continuously rotated into successive engagement with said contact member.

13. A regulating apparatus comprising means for exerting torque in a plurality of directions, a contact member arranged to be moved into positions determined by the direction in which the torque of said means is exerted, and a movable member having a contact surface for engaging said contact member and causing a restraining force to be exerted on said torque exerting means.

In witness whereof, we have hereunto set our hands this 15th day of August 1924.

FRANK T. COLDWELL.
LOUIS W. THOMPSON.